United States Patent [19]
Gillilan, Jr.

[11] 3,947,059
[45] Mar. 30, 1976

[54] MOUNTING BRACKET FOR BICYCLE SAFETY FLAG

[76] Inventor: Robert Lewis Gillilan, Jr., 110 Terrace Drive, Barrington, Ill. 60010

[22] Filed: Nov. 14, 1974

[21] Appl. No.: 523,561

[52] U.S. Cl. ............... 280/289; 116/173; 248/43
[51] Int. Cl.² ........................................ B62J 11/00
[58] Field of Search .......... 280/289, 204, 293, 202; 116/28 R, 173; 248/42, 40, 41, 43; 40/129 C, 129 R, 129 B, 125 M

[56] References Cited
UNITED STATES PATENTS

| | | | |
|---|---|---|---|
| 3,023,027 | 2/1962 | Franciscus | 280/289 |
| 3,443,825 | 5/1969 | Wolf | 280/289 |
| 3,672,323 | 6/1972 | Hawes | 40/129 C |
| 3,812,815 | 5/1974 | Kuenzel | 116/173 |

*Primary Examiner*—Kenneth H. Betts
*Attorney, Agent, or Firm*—Lockwood, Dewey, Zickert & Alex

[57] ABSTRACT

A mounting bracket for supporting a bicycle safety flag wand adjacent the rear end of a bicycle so as not to interfere with a rider swinging his leg over the rear wheel when mounting or dismounting. The bracket is preferably formed of hollow tubular or strip stock with one leg being longer than the other and with the distal end of the longer leg adapted to be secured to a rigid part at the rear of the bicycle such as on one of the sides of the rear wheel fork so that the bracket extends to adjacent the rear end of the bicycle. The second leg of the bracket extends generally upwardly and being open and hollow serves as a socket for receiving the bottom end of the flag wand.

2 Claims, 3 Drawing Figures

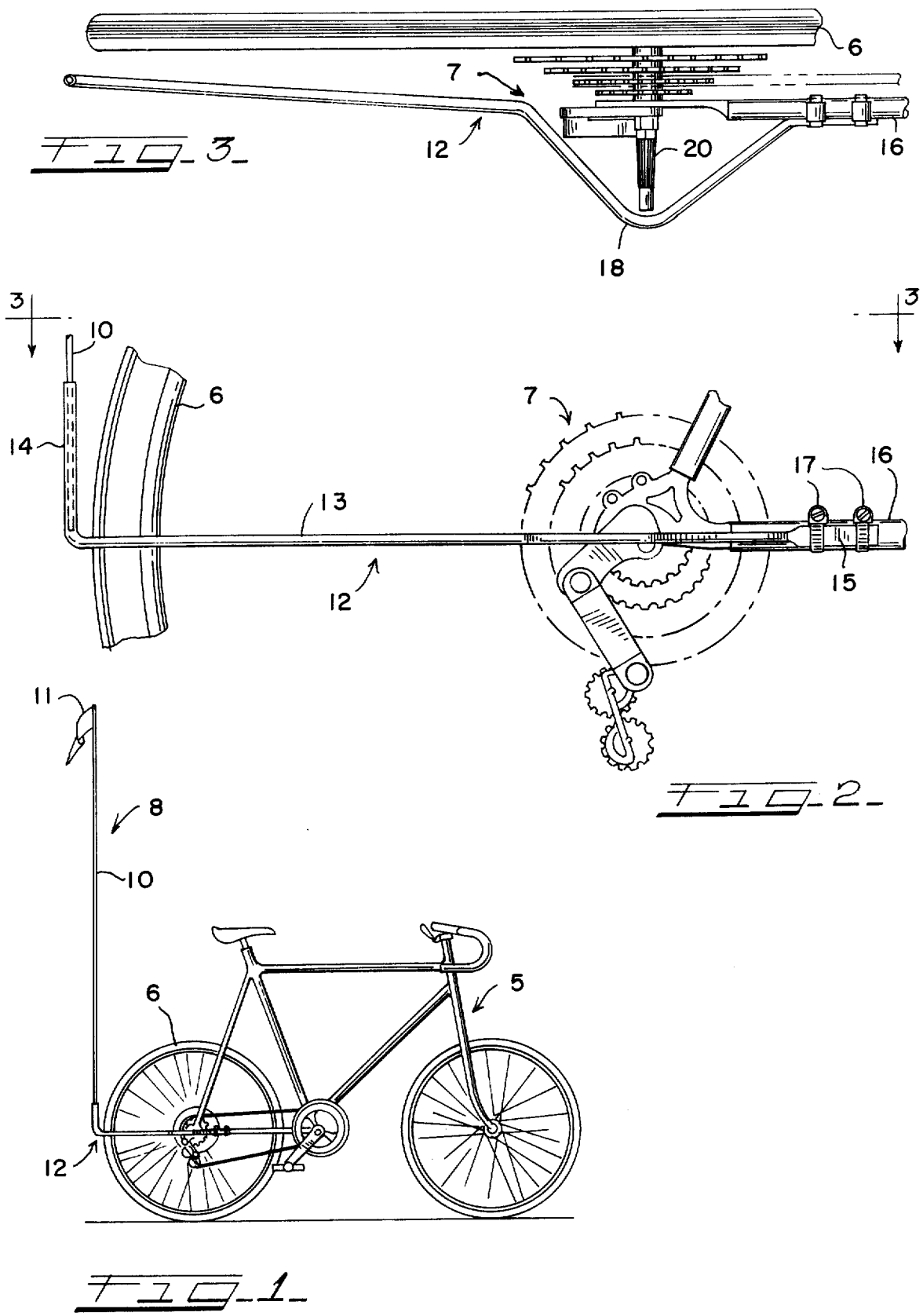

MOUNTING BRACKET FOR BICYCLE SAFETY FLAG

This invention relates generally to a bracket for use in mounting a bicycle safety flag wand adjacent the rear end of a bicycle so that the rider's leg does not engage the flag wand when the rider mounts or demounts from the bicycle and swings his leg over the rear wheel in doing so.

In recent years as bicycle riding has become increasingly popular, the use of bicycle safety flags has become widespread. These safety flags for bicycles generally consist of a tapered plastic rod in the order of six feet in length with a bright-colored flag or penant mounted on the tip end. It has been customary to mount the flag wands in fixtures that are secured to the rear wheel axle. These fixtures ordinarily take the form of a stamping which in effect provides a socket formation into which the lower end of the flag wand may be inserted after the fixture has been clamped in place by a rear axle nut.

A bicycle safety flag when mounted in the customary fashion so that its supporting wand or rod projects upwardly above the rear wheel axle interferes with the freedom with which the rider normally swings his leg over the rear wheel of the bicycle when mounting or demounting. The result is that mounting and demounting become awkward and the rider may lose his balance and fall with more or less serious consequences.

The object of the present invention, generally stated, is the provision of an inexpensive, simple and practical mounting bracket whereby a bicycle safety bike wand can be supported at a position adjacent the rear-most end of a bicycle so that it will not interfere with the rider when he swings one of his legs over the rear wheel in mounting or demounting.

A more specific object of the invention is the provision of a mounting bracket for a bicycle safety flag wand with the bracket being formed of lightweight rod-like or strip-like stock and having the end of a relatively longer leg adapted to be mounted on one side of the frame or fork that supports the rear wheel in such a way that the bracket extends rearwardly with the relatively shorter leg extending generally upwardly and providing a socket into which the lower end of the flag wand may be inserted.

Certain other objects of the invention will be obvious or appear hereinafter. For a more complete understanding of the nature and scope of the invention reference may now be had to the following detailed description taken in connection with the accompanying drawings wherein:

FIG. 1 is a side elevational view of a conventional men's bicycle having a mounting bracket forming one embodiment of the invention secured in place on the bicycle and supporting a bicycle safety flag wand thereon;

FIG. 2 is a fragmentary enlarged side elevation showing the mounting bracket appearing in FIG. 1; and FIG. 3 is a top plan view taken on line 3—3 of FIG. 2.

Referring to the drawings, a conventional men's bicycle is indicated generally at 5 in FIG. 1 the rear wheel 6 of which is provided with a so-called de-railer speed change mechanism of known type indicated generally at 7 in FIG. 3. A safety flag, indicated generally at 8 is mounted at the rear of the bicycle 5 comprising a conventional support wand or rod 10 having a penant or flag 11 mounted on the upper end thereof.

The present invention is directed to the mounting bracket, indicated generally at 12 for mounting the safety flag 8 at the rear of the bicycle 5 rather than mounting it over the spindle or hub of rear wheel 6 where the same would conventionally be mounted. The mounting bracket 12 is generally L-shaped in side elevation when mounted, being formed with a relatively long horizontal leg portion 13 and a relatively short upright leg portion 14. The mounting bracket 12 may be formed of tubular stock such as steel or aluminum for strength and durability. However, other materials may be used such as plastic or fiber glass and the material may be either solid or hollow.

In the drawings the forward end of the mounting bracket 12 is shown as being flattened at 15 so as to facilitate secure clapping thereof to one side 16 of the frame or rear fork in which the rear wheel 6 is mounted. Two conventional band clamps 17—17 of the type used, for example, in securing radiator hose in place, may be used for securing and clamping the flattened end 15 to the frame.

In the drawings the vertical upright leg 14 is shown as being hollow or tubular and of the proper size to receive the lower end of the flag wand 10. If desired, one or more crimps or identations may be placed in the upright leg 14 so as to offer a desired amount of frictional resistance to removal of the wand or rod 10 after it has been put in place while still allowing it to be moved when it is so desired.

It will be seen from FIG. 3 that the longer horizontal leg 13 of the bracket 12 is provided with a dog leg section 18 so as to fit around the projecting stem 20 on the de-railer mechanism 7. The section 18 affords protection to the de-railer mechanism. It will be understood that the dog leg section 18 may not have to be as pronounced or even present with certain types of bicycle rear wheel mechanisms or drives. Referring to FIG. 1, it will be appreciated that the rider is able to freely swing his leg over the rear wheel of the bicycle 5 in mounting and demounting without striking the safety flag wand 10.

It will be understood that if the mounting bracket 12 were made of solid stock, then a sleeve of the proper diameter could be slipped over the upright shorter leg so as to extend above it and provide a socket for the lower end of the wand 10. In the event that the bicycle 5 is provided with a rear mud guard it will be apparent that means could be provided for supporting the rear end of the mounting bracket 12 from the lower or rear end of the mud guard.

I claim:

1. A mounting bracket for a bicycle safety flag wand, said bracket being formed of a rod-like or strip-like member with the distal end of one bracket leg being flat and adapted to be clamped onto one side of the rear wheel generally horizontal supporting fork of the bicycle with the bracket extending rearwardly from said distal end and having an offset therein for clearing a rear wheel de-railer associated with the rear wheel, and with the other bracket leg extending generally upwardly and having a socket formation on its upper end for receiving the bottom end of the flag wand.

2. In combination with a bicycle having a de-railer associated with its rear wheel, a safety flag wand and a generally L-shaped mounting bracket for mounting said wand on the bicycle, said mounting bracket being formed of a rod-like or strip-like member with the distal end of its longer leg being clamped onto one side of the rear wheel generally horizontal support fork of said bicycle adjacent its rear wheel axle and the remainder of said longer leg extending rearwardly and generally horizontally to adjacent the rearmost part of said bicycle and having an offset therein for clearing said de-railer and with the shorter leg of said bracket extending generally upwardly adjacent the rearmost part of said bicycle, and the bottom end of said safety flag wand being mounted on said upwardly extending shorter bracket leg.

\* \* \* \* \*